United States Patent [19]

Wilber

[11] Patent Number: 4,581,877
[45] Date of Patent: Apr. 15, 1986

[54] EQUINE PROTECTIVE EYE COVERING

[76] Inventor: Kathleen I. Wilber, 451 Vineyard Pl., Pasadena, Calif. 91107

[21] Appl. No.: 732,620

[22] Filed: May 10, 1985

[51] Int. Cl.[4] .......................... B68C 5/00; A61F 9/04
[52] U.S. Cl. ..................................... 54/80; 128/132 R
[58] Field of Search ............................. 54/80, 81, 10; 128/132 R

[56] References Cited

U.S. PATENT DOCUMENTS

| | | | |
|---|---|---|---|
| 903,108 | 11/1908 | Rogers | 54/80 |
| 984,017 | 2/1911 | Moritz | 54/80 |
| 2,871,642 | 2/1959 | Damone | 54/80 |
| 4,040,239 | 8/1977 | Powell | 54/80 |
| 4,480,429 | 11/1984 | Knox | 54/80 |

*Primary Examiner*—Hugh R. Chamblee
*Attorney, Agent, or Firm*—Albert O. Cota

[57] ABSTRACT

A hood (20) having a pair of ear openings (22) and eye openings (24) configured to fit the contour of an animals head. A selected eye opening (24) has a semi-rigid ball cup (34) permanently attached on the outside with a removable fabric ring (36) on the inside. The ring (36) is attached with gripper snaps (38) and a sterile gauze pad (40) is held taut over the eye opening (24) with the ring (36) creating a resilient surface to maintain the animals eye in a closed position. A tear pad (42) is positioned under the ring (36) and the hood (20) is affixed to the animals head with a pair of jowl straps (28). A conventional halter (44) is placed over the invention and a pair of upper halter straps (26) are looped and affixed over the halter. The invention keeps the animals eye closed to allow healing of an injured or infected eye.

5 Claims, 6 Drawing Figures

EQUINE PROTECTIVE EYE COVERING

TECHNICAL FIELD

The invention relates to protective covering for animals in general, and more specifically to an eye patch to keep an animal eye shut and dispense medication, also protecting the animal from self-afflicted damage.

BACKGROUND ART

Previously, protection for the eye of an animal has been limited to a structural member, either of a mechanical nature, or as a mask to protect the animal from the intrusion of insects, and the like. A search of prior art did not disclose any patents that read directly on the claims of the instant invention. However, the following U. S. Patents were considered related:

| U.S. Pat. No. | Inventor | Issue Date |
| --- | --- | --- |
| 4,040,239 | Powell | Aug. 9, 1977 |
| 3,753,334 | Blessing | Aug. 21, 1973 |
| 3,104,508 | O'Hare, Jr. | Sep. 24, 1963 |
| 1,550,547 | Furey | Aug. 18, 1925 | that is straped upon a horses head encompassing almost the entire surface. This invention utilizes a blinker cup that is fabricated of a thermoplastic, or leather material, having a securement at the outer edge of the eye opening. These cups form eye socket shields and extend one inch above the eye opening at its central point and taper at the top and bottom leaving at least half of the area open.

Blessing discloses a screen material of a flexible nature with a small mesh plastic net that covers the top portion of the animals head, including the ears. A series of straps are utilized to attach the net to the head using, preferably, a broad elastic fabric material, sized smaller than minimum, stretching to be held in. place by tension. Other embodiments utilize straps and buckles.

O'Hare, Jr. utilizes a mask of hard plastic material shaped to fit over the head and face of a dairy cow, or other animal. The mask has a slot cut-away across the front adjacent to the eyes and is covered by a fine screen permitting the animal to see, but protecting it from flies or other insects. The mask is attached by a strap and buckle under the chin portion.

Furey teaches a mask or shield plate shaped to fit the contour of the animals head. The plates are in two pieces overlapped for adjustment with a guide flange in each front surface. The plates have a series of elongated slots at a point over the animals eyes. A pair of shutters are placed in the flange guide and have a plurality of slots matching those in the face plate. The slots may be registered allowing the animal to see or may be meshed in sequence to completely close the area. Straps and buckles hold the device to the animals head.

DISCLOSURE OF THE INVENTION

When an animal of large stature, such as a horse, has an injured eye due to a scratch on the eyeballs surface, a corneal ulcer, or an infection, etc., the propensity for the animal to irritate the eye by rubbing, scratching, and the like, thereby preventing or prolonging healing has been in evidence. Prior medical treatment has been to surgically sew the eyelid shut which by its very nature is an extreme solution to the problem having its own detrimental effects, among other things, not allowing medication to be properly applied.

With this in mind, it is a primary object of the invention to protect the eye by temporarily keeping the eyelid closed voluntarily by the animal, while still allowing opening for application of medication. When closing the lid, complete rest of the eye is afforded with the iris dilated promoting healing.

An important object of the invention includes the use of a round cup of a semi-rigid material having sufficient structural integrity to keep the animal from touching the eye regardless of the discomfort, irritation, or itching that may be experienced. Further, this cup is ventilated allowing ambient air to reach the eye and yet stop foreign objects, such as flying insects, from being in contact with the injured or diseased body member.

Another object of the invention keeps the medication in place offering immediate relief of the intense pain and itching that many times accompanies an injury or diseases of the eye. This novelty also allows inspection at any given time and addition of further medication, as required, during the healing process. With the protection thus afforded, the bandage is not moved or jarred out of place even if the animal, such as a horse, is physically exercised. This is particularly important with a valuable race horse that requires constant training that may otherwise be interruped denying critical racing seasons.

Still another object allows a conventional halter to be used over the top of the device. This object, therefore, provides the necessary control of the animal utilizing equipment already in use of correct size and fit. Further, the hood is held in place partially with the ancillary halter as straps are provided under the jowls to hold the bottom ends together along with straps on the top near the ears which attach directly to the halter. This allows the hood to be light weight enough to offer the necessary protection, but does not have to have the strength and added weight to control the animals movements.

Yet another object of the invention is directed to a removable gauze bandage integral with the device. The ability to easily remove and replace this gauze allows the eye to be kept clean and new fresh medication to be applied when needed. Also, the gauze bandage is of a conventional size and construction and requires no particular modification for use. Another object of the gauze bandage is that when it is stretched taut it becomes the surface that is in direct contact with the eyelid. The fact that it has sufficient body to keep the eye shut while not applying an inordinant amount of pressure eliminates completely irritation to the delicate eyeball and provides the proper resiliency to perform this important function.

A further object of the invention takes advantage of a removable tear pad directly under the eye bandage. Inasmuch as infected or injured eyes have a tendency to produce tears in much higher than normal volume, a pad at the appropriate location absorbs this liquid and prevents soaking of the mask with this body fluid. Further, this pad is attached with hook and loop tape making it removable and may, therefore, be washed and dried and easily replaced.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
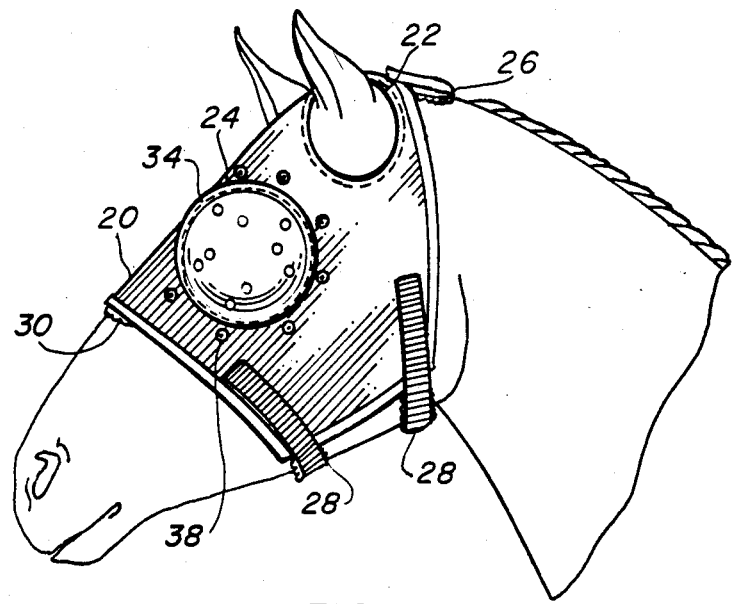
FIG. 1 is a side view of the preferred embodiment shown installed on the head of a horse.
Figure 2:
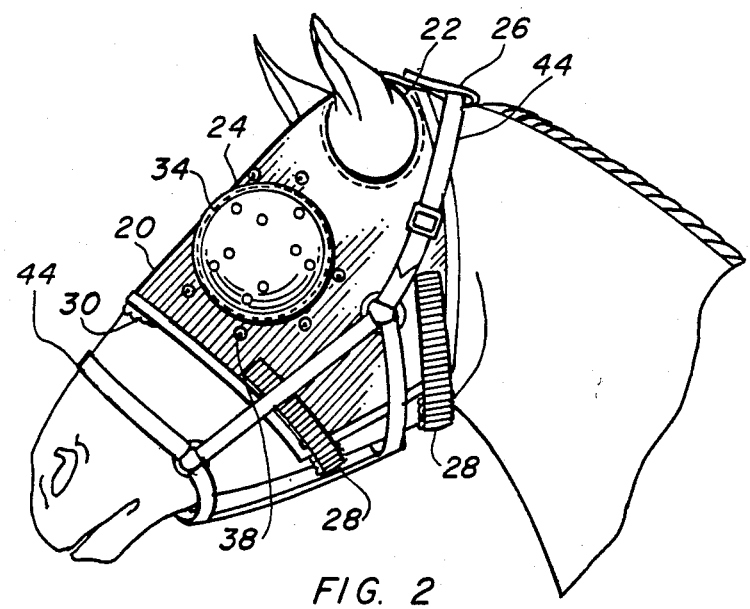
FIG. 2 is the same as above, except a halter has been added to hold the device in place and provide additional mounting support.
Figure 3:
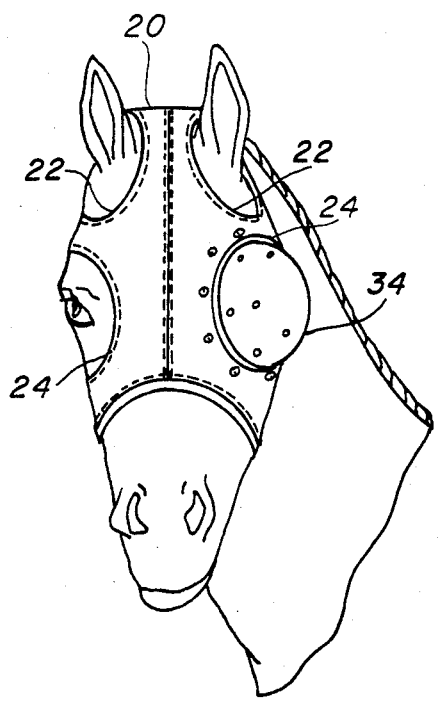
FIG. 3 is the front view of the preferred embodiment as worn by a horse.
Figure 4:
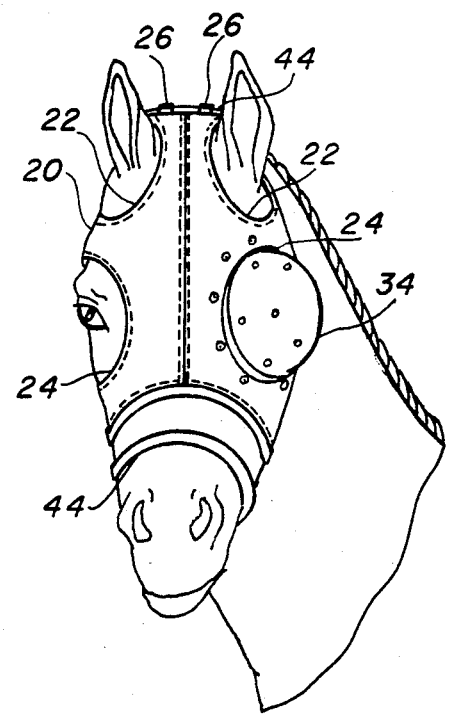
FIG. 4 is the same as above, except a halter has been added to hold the device in place.
Figure 5:
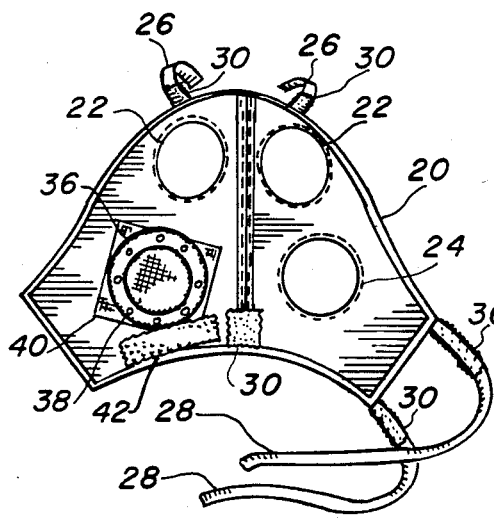
FIG. 5 is a view of the front of the invention spread flat.
Figure 6:
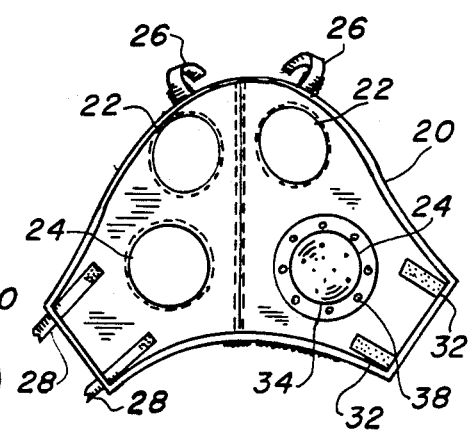
FIG. 6 is a rear view of the invention spread flat.

The best mode for carrying out the invention is presented in the terms of a preferred embodiment that is basically compressed of a blinker hood 20 that is made of a woven fabric material sewn into a shape fitting the contour of an animals head. This hood 20 contains a pair of openings for the ears 22 and eyes 24, also a plurality of upper halter straps 26. The straps 26 are attached to the top edge of the hood 20, preferably by sewing, directly above the ear openings 22. These straps utilize hook and loop tape for structure with the looped surface sewn upon the hooked tape perhaps one third the length contiguous with the hood 20. This configuration allows the tape to be folded back over itself forming a loop that is secured with the mating surface. It will be noted that the hook and loop tape thus employed is commonly known by its registered trademark, "VELCRO".

A resilient pad 30 is attached to the side of the tape straps 26 juxtapositioned with the hood the approximate length of the loop portion of the tape on the opposed side. This pad 30 is of a high tuffed synthetic fabric having the appearance of wool. This material 30, therefore, protects the animals head where the strap reposes, providing a soft resilient interface where attaching pressure is concentrated.

A pair of jowl straps 28 are also attached to the hood, except in a different manner. These straps 28 contain an elastic portion approximately one third of the length with the remainder comprising loop type tape, as previously described. The elastic portion is attached to the hood 20 in from the edge with a pad 30 attached starting from the hoods edge of the same material and utility as described above. The hooked portion of the jowl strap 32 is sewn to the bottom edge of the hood 20 on the upper and lower surface. This arrangement allows the jowl straps 28 to be fastened by placing the hood 20 over the animals head with the ears holding the top portion in place and the straps 28 tensioned from one side to the other under the jowl securing the hood in an easily removable manner.

A semi-rigid ventilated ball cup 34 is permanently attached around one of the eye openings 24 in the hood 20. This cup 34 may be in either eye according to the necessity of the animal under treatment. The cup 34 is fabricated of a material that is structurally sound and yet resilient enough to conform to the shape of the animals face. Preferably this material is of thermoplastic, either vacuum formed, or thermomolded, of a composition such as polypropolene, styrene, polyethylene, cellulose acetate butyrate, polyester, or the like. The cup 34 may be attached by any method known in the art, such as stitching or sewing, riveting, stapling, etc. This cup 34 contains a flange on the bottom distended radially from the exposed edge to facilitate attachment and is in a semispherical shape protecting the animal from self-inflicted damage by providing a raised structural cover.

A removable fabric ring 36 is located on the inside surface of the hood 20 adjacent to the cup 34 around the periphery of the selected eye opening 24. This detachable connecting member provides the structure around the eye opening 24 in an area having a firm shape created by the cup 34. The composition of this ring 36 is preferably a multi-layered fabric with a woven textile on the side nearest the hood 20 and a resilient fabric, such as a tuffed material similar in quality to short fibered wool, next to the animals face. This fabric allows sufficient strength while being soft and pliable in proximity to the affected eye. The removable feature is supplied by a plurality of gripper snaps 38 with the male half attached to the ring and the female half affixed to the hood 20.

A sterile gauze pad 40 is stretched taut between the eye opening 24 containing the cup 34 and the fabric ring 36. The gripper snaps 38 penetrate the gauze pad 40 requiring no modification or special arrangement for attachment. Since this pad 40 is tightly stretched and yet resilient to a certain degree, the animals eye is kept shut by this surface contact allowing not only medication to be administered, but the healing process to take place by the forced closure.

Inasmuch as in cases where the invention is in use, the animals eye produces tears which may be in large quantities and attract flying insects, a washable tear pad 42 is incorporated on the inside surface of the hood 20 below the cup 34 in the eye opening 24. This tear pad 42 is attached to the hood 20 with hook and loop tape sewn on each mating side and is constructed of an absorbant material, such as a cotton towel like fabric. This pad 42 may be easily removed and washed to facilitate cleanliness of the protective device. Excess medication is also absorbed by this pad, along with the animals tears.

In use, the hood 20 is attached to the animals head, as described, and is kept in place by its own shape and the jowl straps 28. A halter 44 of a type, well known in the art, is placed on top of the hood to provide the structural containment with the upper halter straps 26 looped over to insure complete and positive attachment. The device is easily removed for examination of the eye and for administering medication and replacement of a fresh gauze pad 40 and tear pad 42.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the appended claims.

I claim:
1. An animal protective eye covering comprising:
   (a) a blinker hood having a pair of eye and ear openings therethrough;
   (b) a semi-rigid ventilated ball cup permanently attached around one of the eye openings of said hood, for protecting the animals eye from self-afflicted damage by providing a raised structural cover;

(c) a removable fabric ring having fastening means attached to the inside of said blinker hood around the periphery of the eye opening containing said ball cup providing a detachable connecting member;

(d) a sterile gauze pad stretched taut between said eye opening containing said ball cup and said fabric ring to keep the animals eye closed and to dispense medication therefrom upon the animal to facilitate healing; and, (e) a washable tear pad removably fastened upon the inside surface of said blinker hood immediately below the eye opening having the ball cup, for absorbing the animals tears and excess moisture from medication placed upon said sterile gauze.

2. The invention as recited in claim 1 wherein said blinker hood further comprises:

a plurality of upper halter straps attached at the top edge of said hood to loopingly engage a halter placed upon said eye covering for containment therewith;

a pair of detachable jowl straps attached at the bottom of said hood to hold the eye covering upon the animals head; and, a plurality of resilient pads placed upon said straps, and centrally located on the inside bottom surface of said hood to cushion the bearing surfaces upon the animals head where pressure is brought to bear.

3. The invention as recited in claim 1 wherein said ventilated ball cup further comprises:

a semi-spherical resilient member having a flange distended radially from the exposed edge permanently fastened to said hood by sewing.

4. The invention as recited in claim 1 wherein said fastening means attached to the inside of the hood further comprise:

a plurality of gripper snaps with the male half attached to said ring and the female half attached to said ring and the female half attached to said hood in such a manner as to encapsulate said gauze pad therebetween.

5. The invention as recited in claim 1 wherein said tear pad further comprises:

an absorbant fabric material attached to said hood by hook and loop tape.

* * * * *